(12) United States Patent
Boren et al.

(10) Patent No.: US 8,770,517 B2
(45) Date of Patent: Jul. 8, 2014

(54) AIRCRAFT LAVATORY AND GALLEY SEPARATED BY AN INTERNAL WALL HAVING AN INTERMEDIATE NOTCH THAT IMPROVES THE LAVATORY ENVIRONMENT

(71) Applicant: The Boeing Company, Chicago, IL (US)

(72) Inventors: Kelly L. Boren, Marysville, WA (US); Mithra M. K. V. Sankrithi, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 13/645,972

(22) Filed: Oct. 5, 2012

(65) Prior Publication Data

US 2014/0097294 A1 Apr. 10, 2014

(51) Int. Cl.
*B64D 11/00* (2006.01)
(52) U.S. Cl.
USPC ............. 244/118.5; 244/117 R; 105/315

(58) Field of Classification Search
USPC .......... 244/118.5, 118.6, 129.6; 105/314–319
See application file for complete search history.

(56) References Cited

U.S. PATENT DOCUMENTS

| 1,767,361 | A | * | 6/1930 | Hautot | 105/315 |
| 4,884,767 | A | * | 12/1989 | Shibata | 244/118.5 |
| 7,222,820 | B2 | * | 5/2007 | Wentland et al. | 244/118.5 |
| 7,275,716 | B2 | * | 10/2007 | Saint-Jalmes | 244/118.6 |
| 7,354,018 | B2 | * | 4/2008 | Saint-Jalmes | 244/118.5 |
| 7,866,603 | B2 | * | 1/2011 | Cooper et al. | 244/118.5 |
| 2005/0116099 | A1 | * | 6/2005 | Pho et al. | 244/118.5 |
| 2012/0221192 | A1 | * | 8/2012 | Seibt | 701/29.1 |
| 2013/0099055 | A1 | * | 4/2013 | Pfeiffer | 244/118.5 |
| 2013/0206904 | A1 | * | 8/2013 | Gee et al. | 244/118.5 |

* cited by examiner

*Primary Examiner* — Christopher P Ellis
*Assistant Examiner* — Medhat Badawi
(74) *Attorney, Agent, or Firm* — Joseph M. Rolnicki; Evans & Dixon, LLC

(57) ABSTRACT

An internal wall in an aircraft cabin separates a lavatory and a galley of the aircraft. The internal wall has an intermediate notch that increases a lateral width dimension of the lavatory above the notch and thereby improves the spatial environment of the lavatory.

21 Claims, 4 Drawing Sheets

AIRCRAFT LAVATORY AND GALLEY SEPARATED BY AN INTERNAL WALL HAVING AN INTERMEDIATE NOTCH THAT IMPROVES THE LAVATORY ENVIRONMENT

FIELD

The present invention pertains to the configuration of an internal wall in an aircraft cabin that separates a lavatory and a galley of the aircraft. In particular, the present invention pertains to an aircraft cabin having a lavatory and galley separated by an internal wall, where the internal wall has an intermediate notch that increases a lateral width dimension of the lavatory above the notch and thereby improves the environment and enhances the functionality and ergonomics of the lavatory.

BACKGROUND

Commercial aircraft set up for the transportation of passengers typically include rows of seats along the length of the aircraft cabin that are separated by a central aisle, at least one galley in the cabin, and one or more lavatories in the cabin. Because the primary purpose of a commercial aircraft is to transport passengers, the aircraft cabin is usually set up to maximize the number of seats in the cabin. As a result, it is challenging to provide adequate lavatory space without reducing seat count.

A typical passenger aircraft includes at least one lavatory enclosure that is positioned along the central aisle of the aircraft among the rows of seats. The lavatory enclosure is accessed through a doorway from the central aisle. The width of the lavatory enclosure is typically not much larger than the width of the doorway. The dimensions of the lavatory enclosure often make it difficult for a user to move around in the enclosure, much less provide comfortable elbow room in the enclosure. Thus, passengers who are above median height and weight and are using conventional aircraft lavatories may feel uncomfortably confined in the lavatory enclosure.

SUMMARY

The aircraft lavatory enclosure of the present invention overcomes the disadvantages associated with prior art aircraft lavatory enclosures discussed above. This is accomplished by repositioning the lavatory enclosure in the aircraft cabin away from the rows of the seats and the central aisle. The lavatory enclosure of the invention is moved to a position adjacent a cross-aisle at the rear of the aircraft cabin that provides access to two aircraft cabin doors on laterally opposite sides of the aircraft. Moving the aircraft lavatory to a position rearwardly of the cross-aisle enables the lavatory enclosure to be reconfigured to make the best use of available space at the rear of the aircraft cabin.

In the aircraft of the invention, a pair of lavatory enclosures are positioned adjacent laterally opposite sides of the aircraft body. Each of the lavatories is positioned in areas on opposite sides of a galley located at the rear of the aircraft cabin. The first lavatory of the pair is positioned between one side of the galley and a first interior sidewall of the aircraft body and the second lavatory of the pair is positioned between the opposite side of the galley and a second interior sidewall of the aircraft body. The first and second lavatories are basically mirror images of each other. Therefore, only the first lavatory enclosure will be described in detail, with it being understood that the second lavatory enclosure is a mirror image thereof.

The first lavatory enclosure includes a front wall with a doorway that is accessible from the cross aisle of the cabin. The front wall extends laterally from the first interior sidewall of the aircraft body to the galley in the rear of the aircraft cabin. An internal wall in the cabin separates the lavatory from the galley. The internal wall extends longitudinally from the lavatory front wall to a rear bulkhead wall of the aircraft cabin. The internal wall is comprised of a lower section, and intermediate section and an upper section that are all interconnected. The wall lower section extends vertically upwardly from the floor surface between the adjacent lavatory and the galley. The lower section extends upwardly to a vertical height above the toilet in the adjacent lavatory where the lower section connects with the intermediate section. The wall intermediate section extends from the lower section laterally towards the centerline of the airplane and over a lower portion of the galley. The wall upper section then extends vertically upwardly from the intermediate section to the roof of the cabin. The intermediate section of the wall moves the upper section of the wall laterally away from the center of the toilet. This creates a notch in the lavatory that increases the lateral width of the lavatory above the wall intermediate section. The increase in the lavatory width provides more usable space in the lavatory for passengers using the lavatory, while still retaining the small footprint of the lavatory on the floor surface of the aircraft between the wall lower section and the adjacent interior sidewall of the aircraft. The increased usable space gives the lavatory an impression of additional spaciousness and a more comfortable atmosphere. Additionally, the repositioned lavatory has made more space available along the central aisle of the aircraft to add passenger seating and improve the economic efficiency of the aircraft.

BRIEF DESCRIPTION OF THE DRAWINGS

Further features of the aircraft lavatory of the invention are set forth in the following detailed description of the aircraft and in the drawing figures.

DESCRIPTION

Figure 3:
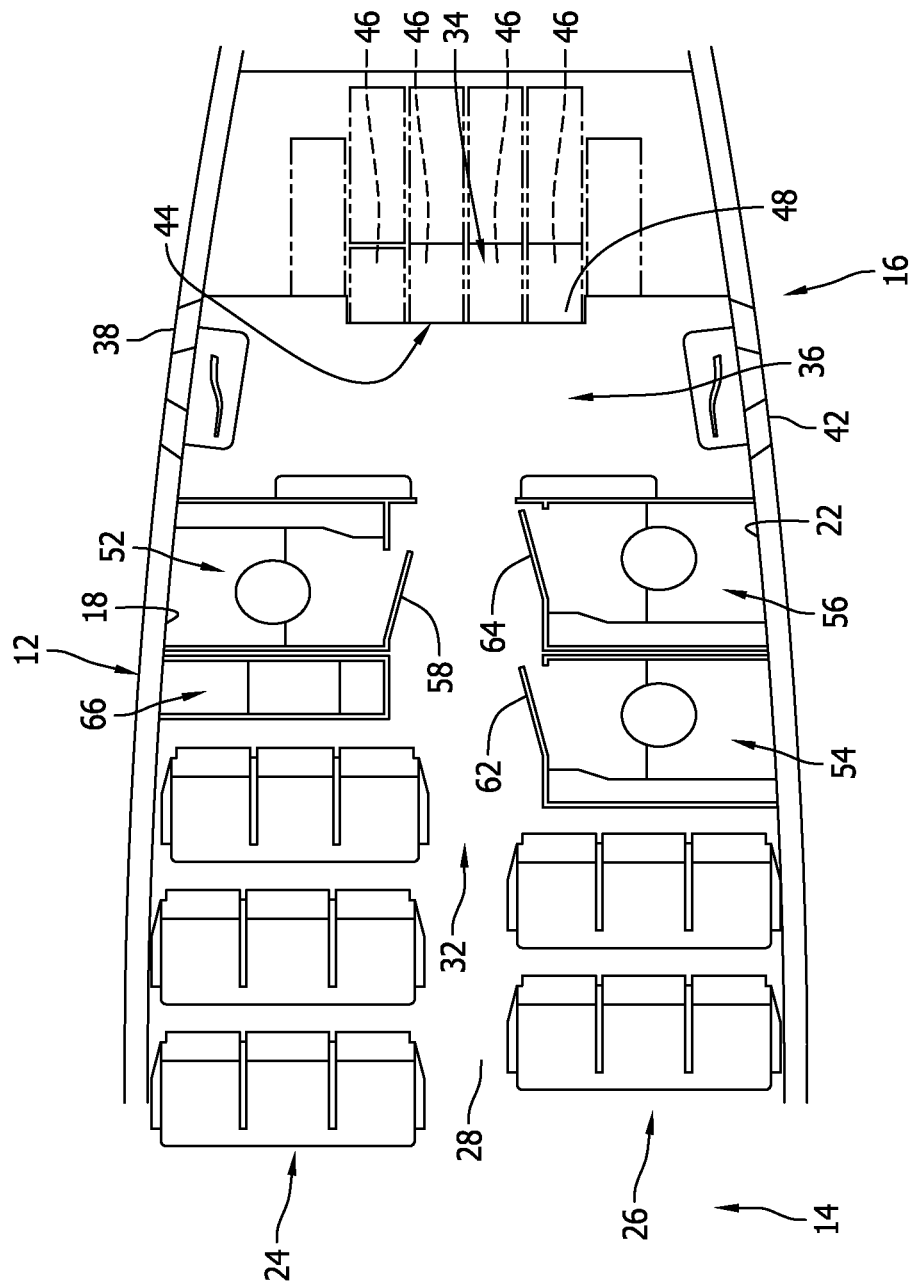
FIG. 3 is a representation of a portion of a conventional aircraft floor plan at the rear of the aircraft cabin showing the typical locations of lavatories of the aircraft relative to the passenger seating and the galley of the aircraft.

FIG. 3 is a representation of the floor plan at the rear of a typical aircraft cabin where lavatories of the aircraft are located. In FIG. 3 a rearward portion of the aircraft fuselage or body 12 that surrounds the aircraft cabin is shown in cross section. As is conventional, the aircraft cabin has a longitudinal length between a front 14 of the cabin and a rear 16 of the cabin. The cabin also has a lateral width between opposite outboard first 18 and second 22 interior sidewalls of the aircraft body.

A plurality of rows of seats 24, 26 may be arranged on the floor surface 28 of the aircraft cabin. The rows of seats 24, 26 may also be arranged on laterally opposite sides of the cabin and define a central aisle 32. The central aisle 32 may also extend longitudinally through the cabin across the floor surface 28 between the front 14 and rear 16 of the cabin and between the rows of seats 24, 26. A galley 34 may be provided in the rear of the cabin at the rearward end of the central aisle 32. This space could be used for other purposes and could be broadly described as a stowage space 34.

A cross aisle 36 may extend laterally across the rear 16 of the cabin in front of the galley 34. The cross aisle 36 may extend between a pair of boarding doors 38, 42 in the respective sidewalls 18, 22 of the aircraft body.

The galley 34 may typically include a galley cart compartment 44 containing a plurality of galley carts 46. In the example shown in FIG. 1 the galley cart compartment 44 contains four galley carts 46. Each galley cart 46 is supported by rollers on the floor surface 28 and is inserted longitudinally into a slot provided for the cart in the compartment 44. The galley also includes a countertop 48 on top of the compartment 44. Although not shown, the galley 34 also may include appliances such as a coffee maker, a hotplate, a microwave oven, etc. above the counter 48.

Galley equipment is produced according to basically two worldwide standards, namely ATLAS and KSSU. These have their origins in the industry in legacy maintenance resource pools (ATLAS=Alitalia, TAP, Lufthansa, Air France, Sabena and KSSU=KLM, Swissair, SAS, UTA) and have subsequently developed into industry standards to enable modular equipment interchange between aircraft of different manufacturers.

Each piece of ATLAS standard equipment is preferably able to fit in any ATLAS galley on any aircraft type of any airline worldwide. The same is true for the KSSU standard equipment. ATLAS equipment is today's leader for worldwide market share with about 75% of galley equipment manufactured being either ATLAS standard or ATLAS compatible. KSSU has about a 20% market share and a handful of legacy air lines with proprietary standards (BA has a proprietary standard called "ACE" for example) account for the remaining 5%.

Equipment standards for ATLAS and KSSU include specifications for most anything ranging from carts to oven racks to coffeepots to plastic cups to storage boxes. A variation of even a single millimeter from the standard specifications for galley equipment could result in equipment not being able to stow securely and the consequent safety issues that result.

Most equipment is actually manufactured by the same companies. For example, rotatable or movable equipment (carts, etc.) are manufactured by companies such as Driessen and Diethelm-Keller. Consumables such as trays, cups, etc. are manufactured by companies such as DeSter and Helios. These companies either provide airlines with branded or generic versions of existing designs or developed entirely new product lines within the existing standards.

In the example shown in FIG. 3, the aircraft includes three lavatory enclosures 52, 54, 56. Each of the enclosures is accessible through a respective door 58, 62, 64 of the enclosures 52, 54, 56. A small coat closet 66 is also provided in the cabin. As can be seen in FIG. 3, the width dimension of each of the lavatory enclosures 52, 54, 56 set in order to maximize the passenger seating in the aircraft cabin. The width of each lavatory enclosure 52, 54, 56 is not much larger than the width of its respective door 62, 64, 66. The dimensions of the lavatory enclosures 52, 54, 56 often make it difficult for a user to enter the enclosure from the central aisle 32 and move around in the enclosure, much less provide comfortable elbow room in the enclosure. The narrow width of the enclosures 52, 54, 56 may result in passengers using the lavatories feeling uncomfortably confined in the enclosures.

The aircraft lavatory enclosure of the present invention overcomes the disadvantages associated with prior art aircraft lavatory enclosures discussed above. This is accomplished by repositioning the lavatory enclosure in the aircraft cabin away from the rows of the seats and the central aisle. The enclosure is moved to a position rearwardly of the cross-aisle 36 at the rear of the aircraft cabin. Moving the aircraft lavatory to a position rearwardly of the cross-aisle 36 enables the lavatory enclosure to be reconfigured to make the best use of available space at the rear of the aircraft cabin.

Figure 1:
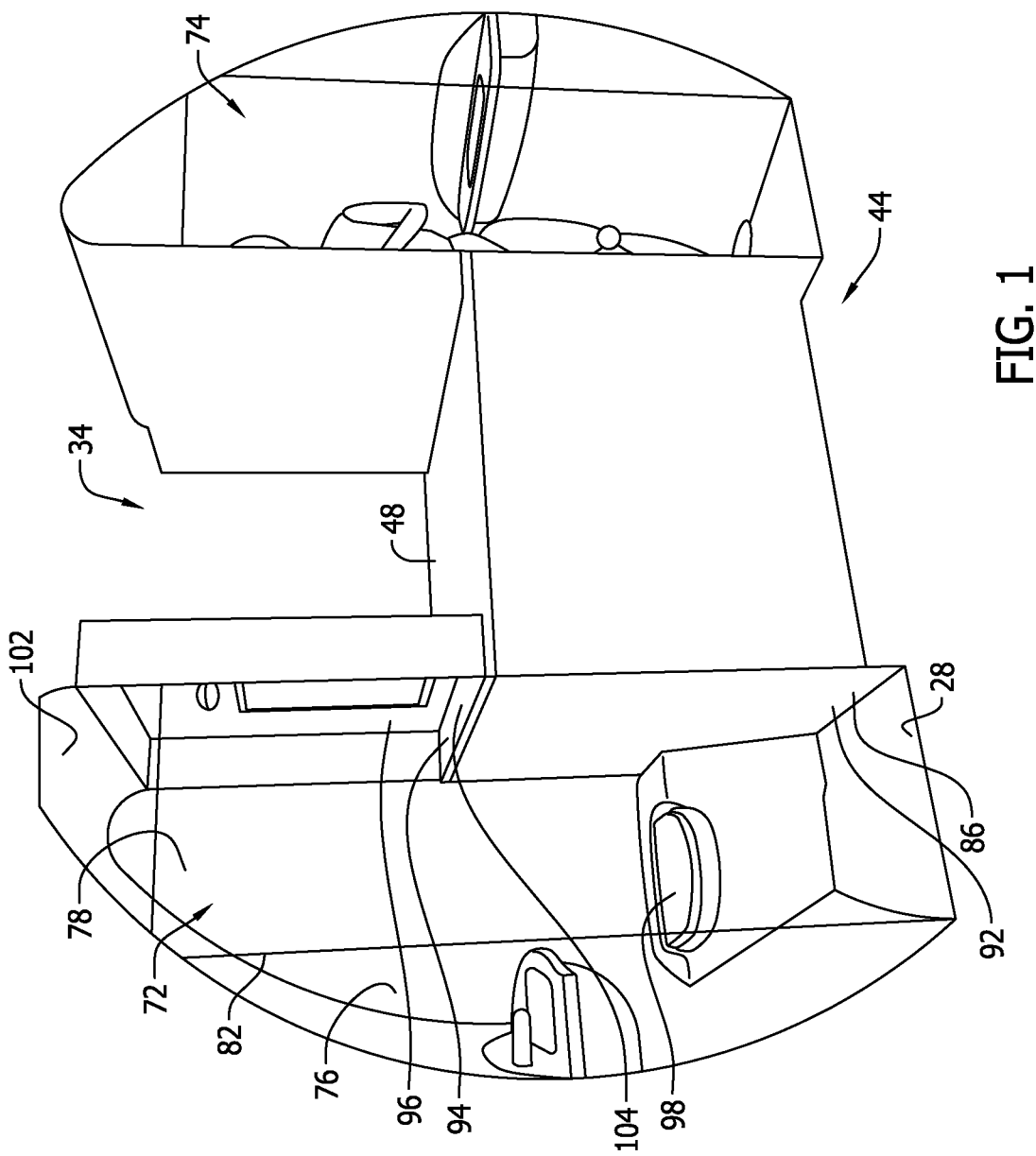
FIG. 1 is a representation of a front perspective view of the aircraft lavatory.
Figure 2:
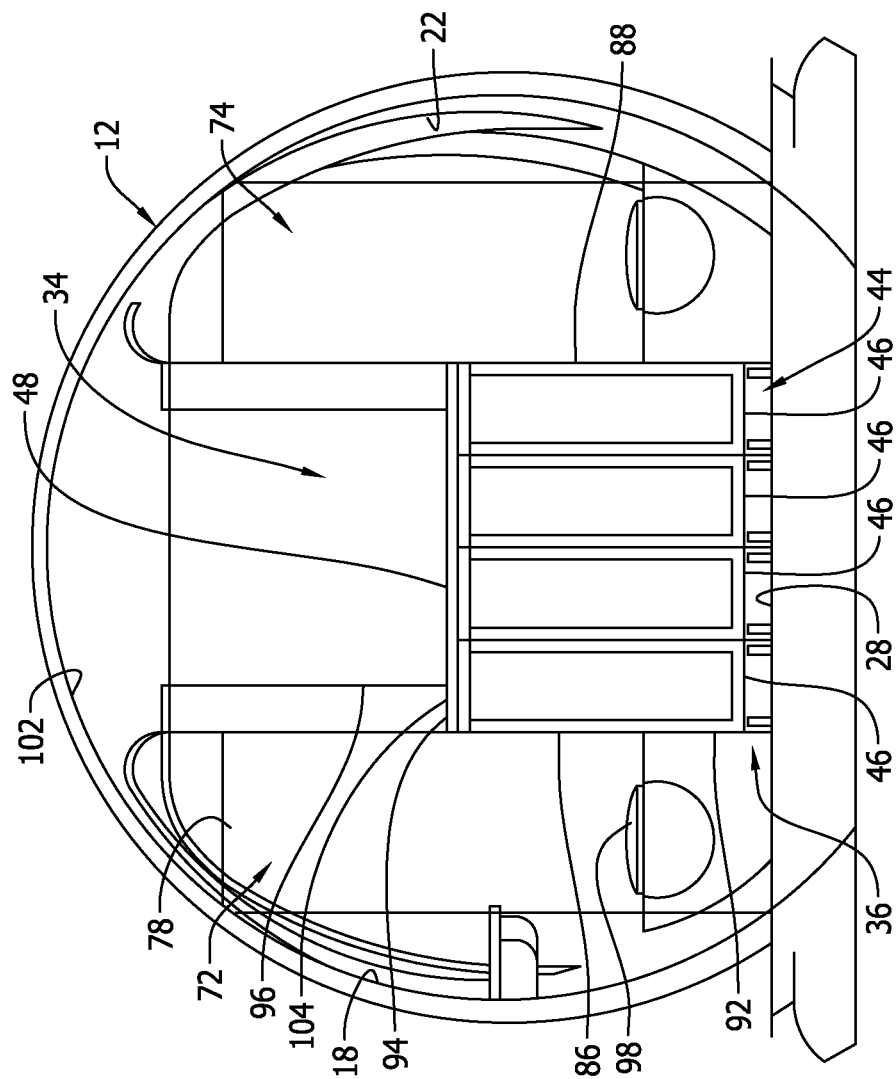
FIG. 2 is a representation of a front view of the lavatory of the invention at the rear of the aircraft cabin.
Figure 4:
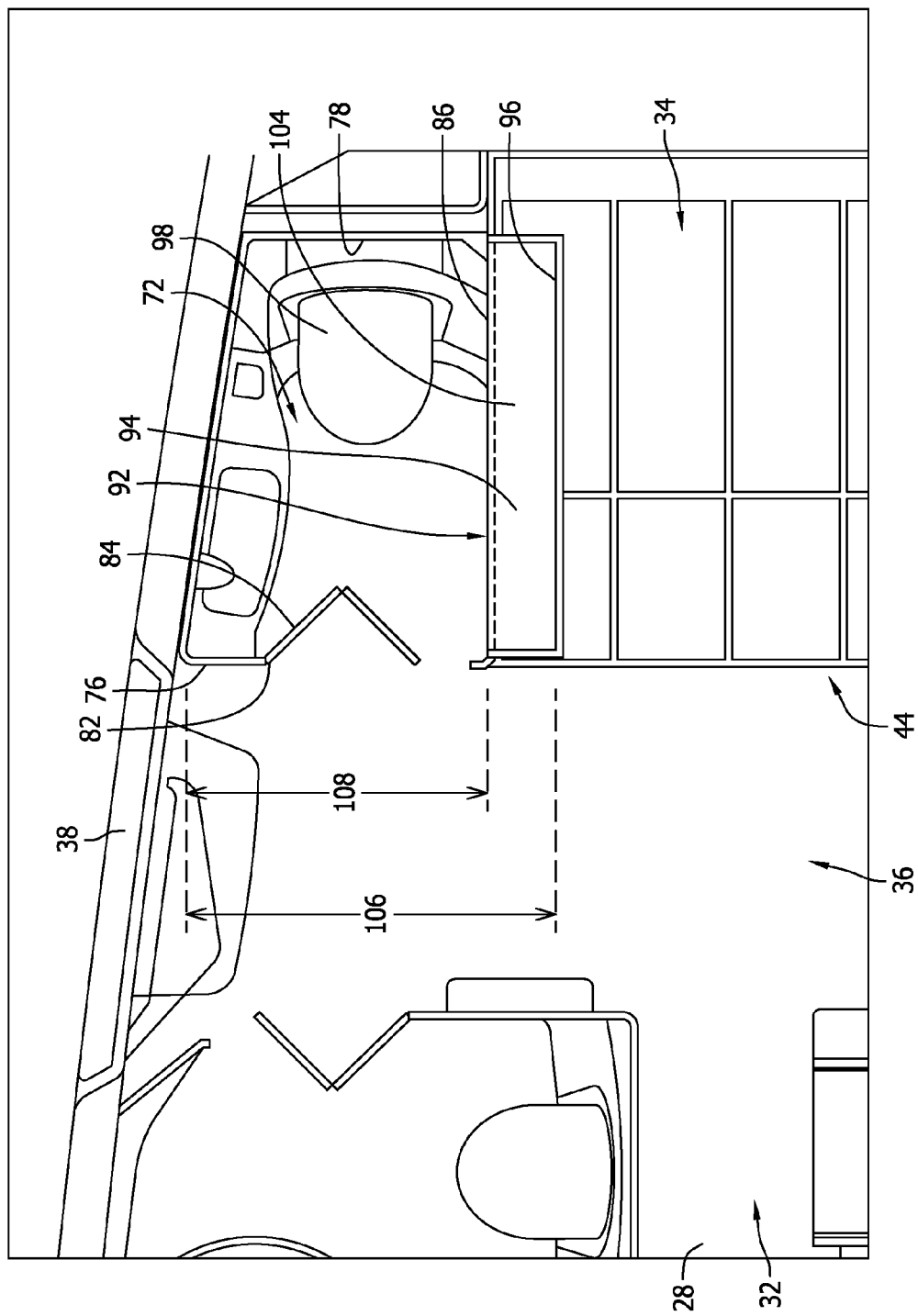
FIG. 4 is a representation of the floor plan at the rear of the aircraft of the invention with the relocated lavatory of the invention.

FIG. 2 is a front elevation view of a pair of lavatories 72, 74 of an embodiment of the present invention that have been installed at the rear of the aircraft cabin shown in FIG. 1. The lavatories 72, 74 are positioned rearwardly of the cross-aisle 36 and on laterally opposite sides of or outboard of the galley 34. In comparing FIGS. 1 and 2, it can be seen that the lavatories 72, 74 have been positioned in areas available between the galley 34 and the opposite outboard first 18 and second 22 interior sidewalls of the aircraft body. FIG. 1 is a perspective review of a pair of lavatories of the invention, and FIG. 4 is a plan view of one of the lavatories of the invention. In the embodiments shown in FIGS. 1 and 2 the pair of lavatories may include a first 72 and second 74 lavatory that are mirror images of each other. Only the first lavatory 72 will be described in detail.

Referring to FIG. 2, the lavatory 72 may include a front wall 76 as part of its enclosure. The aircraft body first internal sidewall 18 and a rear bulkhead wall or aft pressure bulkhead (APB) 78 of the aircraft may also form portions of the enclosure of the lavatory. As shown in FIGS. 2 and 4, the aircraft body first interior sidewall 18 substantially conforms to an outboard portion of the enclosure of the lavatory and the aft pressure bulkhead 78 substantially conforms to an aft portion of the enclosure of the lavatory. The front wall 76 may have a doorway 82 that is accessible from the cross-aisle 36. A door 84 is secured to the front wall 76 and can be manually operated to selectively open and close the doorway 82 in a conventional manner. The door 84 selected for the lavatory 72 may be a double fold door that basically folds into the area of the lavatory 72 when opening the door. This prevents the door 84 from obstructing movement through the cross aisle 36 at the rear of the cabin.

In addition, the enclosure of the lavatory 72 includes an inboard internal wall 86. The inboard internal wall 86 may be positioned laterally between the galley 34 and the lavatory 72. In this position the inboard internal wall 86 of the enclosure of the lavatory serves to separate the lavatory 72 and the stowage space 34. In a further embodiment an aircraft may contain two lavatories 72, 74 in the aircraft cabin. They may be arranged such that, a pair of internal walls 86, 88 in the cabin separate each of the respective lavatories 72, 74 from the galley 34 at the center of the cabin.

The first internal wall 86 is comprised of a lower section 92, an intermediate section 94 and an upper section 96. Each of the sections may be interconnected as seen in the drawing figures. Additionally, each of the wall sections extend longitudinally through the cabin from the lavatory enclosure front wall 76 to the rear bulkhead wall 78, thereby completing the lavatory enclosure.

The wall lower section 92 may extend vertically upwardly from the floor surface 28 between a lower area of the adjacent lavatory 72 and a lower area of the galley 34. The lower section 92 may be perpendicular to the floor surface 28 and extends upwardly from the floor surface to the wall intermediate section 94. The height of the lower section 92 may position the intermediate section 94 at a position vertically above the toilet 98 in the lavatory 72. Additionally, the height of the lower section 92 may position the intermediate section 94 vertically above the galley cart compartment 44.

The intermediate section 94 extends horizontally from the lower section 92 over the lower area of the galley and the galley cart compartment 44 and inboard or toward the centerline of the airplane from the lavatory 72. The intermediate section 94 extends from the lower section 92 to the wall upper section 96. As shown in FIGS. 2 and 3, the wall intermediate section 94 may be coplanar with the galley counter top 48. In an alternative embodiment, the intermediate section 94 may be continuous with the galley counter top 48. In a further embodiment a single structure may form the wall intermediate section 94 and the galley counter top 48. The intermediate section also adds a countertop 104 to the lavatory 72. Depending on the type of equipment employed in the galley, for example whether ATLAS or KSSU equipment is used, and what quantities of equipment, for example whether four carts or three carts are used, the intermediate section 94 could have a lateral width dimension ranging from 2 inches to 20 inches. In other environments, the intermediate section 94 could have other lateral width dimensions and other orientations than the horizontal orientation shown.

The wall upper section 96 may extend vertically upwardly from the intermediate section 94 between an upper area of the lavatory and an upper area of the galley to the roof 102 of the aircraft cabin. Due to the tapered configuration of the aircraft fuselage or body 12, as the aircraft extends from a front 14 of the aircraft cabin to a rear 16 of the aircraft cabin, the fuselage crowned surface of the aircraft has an increased height in a region of the front wall 76 of the lavatory enclosure as compared to the height in the region of the aft pressure bulkhead 78 or rear of the lavatory enclosure. As represented in FIG. 1, this difference in height of the fuselage crowned surface of the aircraft body 12 adjacent the lavatory front wall 76 enables the lavatory ceiling or roof 102 that is spaced from the fuselage crowned surface as shown in FIG. 2 to have an increased standing height in the region of the front wall 76 of the lavatory as compared to the height in the region of the rear wall or aft pressure bulkhead 78 of the lavatory. The intermediate section 94 positions the upper section 96 laterally further inboard from the first interior sidewall 18 of the aircraft body from the lower section 92. Thus as shown in FIG. 4, the lateral width dimension 106 of the lavatory 72 above of the intermediate section 94 is larger than the largest lateral width dimension 108 of the lavatory 72 below the intermediate section 94. Furthermore, the intermediate section 94 and the upper section 96 together form a notch in the lavatory 72 that provides additional area to the lavatory. The increase in the lavatory width above the intermediate section 94 provides more usable space in the lavatory for passengers using the lavatory, while still retaining the small footprint of the lavatory on the floor surface 28 between the lower section 92 and the first interior sidewall 18. The increased usable space gives a lavatory an impression of spaciousness and a more comfortable atmosphere. Additionally, as represented in FIG. 1, the visual apparent width in the notch in the lavatory 72 formed by the intermediate section 94 and the upper section 96 can be further increased by locating a mirror in the notch and on the upper section 96 of the inboard internal wall 86 of the enclosure.

With the modification of the rear of the aircraft cabin shown in FIG. 1 by the repositioned lavatories of the invention, the lavatory enclosures 52, 54, 56 shown at the rear of the aircraft cabin 16 in FIG. 3 can be removed, enabling the addition of more passenger seating to the aircraft and thereby improving the economic efficiency of the aircraft.

As various modifications could be made in the construction of the invention herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. An aircraft comprising:
an aircraft body containing an aircraft cabin, the aircraft cabin having a longitudinal length between a front of the cabin and a rear of the cabin, and the aircraft cabin having a lateral width between opposite first and second interior sidewalls of the aircraft body, the first and second interior sidewalls extending upwardly and curving laterally toward each other to a roof of the aircraft cabin;
a floor surface in the aircraft cabin;
a stowage space in the aircraft cabin;
a lavatory in the aircraft cabin, the lavatory being positioned in an area available between the stowage space and the first interior sidewall of the aircraft body, the lavatory including a front wall as part of an enclosure of the lavatory, the front wall having a doorway and a door secured to the front wall that can be manually operated to selectively open and close the doorway;
the aircraft body first interior sidewall substantially conforming to an outboard portion of the enclosure of the lavatory;
an aircraft aft pressure bulkhead substantially conforming to an aft portion of the enclosure of the lavatory; and,
an internal inboard wall of the enclosure of the lavatory serving to separate the lavatory and the stowage space, the internal inboard wall having a lower section, an intermediate section and an upper section that are all interconnected, the lower section extending vertically upwardly from the floor surface between a lower area of the lavatory and a lower area of the stowage space to the intermediate section, the intermediate section extending horizontally over the lower area of the stowage space from the lower section to the upper section, and the upper section extending vertically upwardly from the intermediate section between an upper area of the lavatory and an upper area of the stowage space to a roof of the lavatory, whereby a lateral width dimension of the lavatory above the intermediate section is larger than a largest lateral width dimension of the lavatory below the intermediate section.

2. The aircraft of claim 1, further comprising:
a lateral width dimension of the stowage space below the intermediate section being larger than a largest lateral width dimension of the stowage space above the intermediate section.

3. The aircraft of claim 1, further comprising:
the first interior sidewall of the aircraft body being at a laterally opposite side of the lavatory from the internal inboard wall.

4. The aircraft of claim 1, further comprising:
a galley cart compartment in the lower area of the stowage space, the galley cart compartment being positioned vertically beneath the internal inboard wall intermediate section and containing at least one galley cart supported on the floor surface and inserted longitudinally beneath the internal inboard wall intermediate section.

5. The aircraft of claim 1, further comprising:
a toilet in the lavatory; and
the internal inboard wall intermediate section being positioned vertically above the toilet.

6. The aircraft of claim 1, further comprising:
a countertop on the internal inboard wall intermediate section inside the lavatory, the countertop having a width dimension ranging from two inches to twenty inches.

7. The aircraft of claim 1, further comprising:
the internal inboard wall being a first internal inboard wall of a pair of first and second internal inboard walls in the aircraft cabin;
the lavatory being a first lavatory of a pair of first and second lavatories in the aircraft cabin;
the first and second internal inboard walls being positioned on laterally opposite sides of the stowage space; and,
the second internal inboard wall having a lower section, an intermediate section and an upper section that are all interconnected, the second internal inboard wall lower section extending vertically upwardly from the floor surface between a lower area of the second lavatory and the lower area of the stowage space to the second internal inboard wall intermediate section, the second internal inboard wall intermediate section extending horizontally over the lower area of the stowage space from the second internal inboard wall lower section to the second internal inboard wall upper section, and the second internal inboard wall upper section extending vertically upwardly from the second internal inboard wall intermediate section between an upper area of the second lavatory and the upper area of the stowage space, whereby a lateral width dimension of the second lavatory above the second internal inboard wall intermediate section is larger than a largest lateral width dimension of the second lavatory below the second internal inboard wall intermediate section.

8. An aircraft comprising:
an aircraft body containing an aircraft cabin, the aircraft cabin having a longitudinal length between a front of the cabin and a rear of the cabin, the aircraft cabin having a lateral width between opposite first and second interior sidewalls of the aircraft body, the first and second interior sidewalls extending upwardly and curving laterally toward each other to a roof of the aircraft cabin, and the aircraft cabin having a flat rear bulkhead wall that extends laterally across the rear of the aircraft cabin between the first and second interior sidewalls of the aircraft body;
a floor surface in the aircraft cabin;
an internal wall in the aircraft cabin, the internal wall being laterally spaced from the first interior sidewall of the aircraft body and defining a lavatory containing a toilet laterally between the internal wall and the first interior sidewall, the lavatory including a front wall as part of an enclosure of the lavatory, the front wall having a doorway and a door secured to the front wall that can be manually operated to selectively open and close the doorway, the internal wall extending longitudinally through the aircraft cabin and having a lower section, an intermediate section and an upper section that are interconnected, the lower section extending vertically upwardly from the floor surface to the intermediate section, the intermediate section extending horizontally from the lower section and laterally away from the first interior sidewall of the aircraft body to the upper section, and the upper section extending vertically upwardly from the intermediate section to the roof of the aircraft cabin whereby the intermediate section and the upper section form a notch with additional area to the lavatory, the lower section, the intermediate section and the upper section each extending longitudinally through the aircraft cabin from the lavatory enclosure front wall to the rear bulkhead wall; and,
the aircraft body first internal sidewall, the aircraft rear bulkhead wall, the lavatory front wall and the internal wall all forming an enclosure of the lavatory.

9. The aircraft of claim 8, further comprising:
a lateral width dimension of the lavatory between the internal wall upper section and the first interior sidewall being larger than a largest lateral width dimension of the lavatory between the internal wall lower section and the first interior sidewall.

10. The aircraft of claim 8, further comprising:
the internal wall intermediate section being positioned vertically above the toilet.

11. The aircraft of claim 8, further comprising:
a countertop on the internal wall intermediate section inside the lavatory notch, the countertop having a lateral width dimension ranging from two inches to twenty inches.

12. The aircraft of claim 8, further comprising:
a galley in the aircraft cabin on a laterally opposite side of the internal wall from the lavatory, a galley cart compartment in a lower area of the galley, the galley cart compartment being vertically beneath the internal wall intermediate section and containing at least one galley cart supported on the floor surface and inserted longitudinally beneath the internal wall intermediate section.

13. The aircraft of claim 8, further comprising:
the internal wall being a first internal wall of a pair of first and second internal walls in the aircraft cabin;
the lavatory being a first lavatory of a pair of first and second lavatories in the aircraft cabin;
the first and second internal walls being positioned on laterally opposite sides of the galley; and,
the second internal wall having a lower section, an intermediate section and an upper section that are interconnected, the second internal wall lower section extending vertically upwardly from the floor surface to the second internal wall intermediate section, the second internal wall intermediate section extending horizontally from the second internal wall lower section and laterally away from the second interior sidewall of the aircraft body to the second internal wall upper section, and the second internal wall upper section extending vertically upwardly from the second internal wall intermediate section whereby the second internal wall intermediate section and upper section form a notch with additional area to the second lavatory.

14. A method of increasing passenger seating of an aircraft, the method comprising:
providing the aircraft with an aircraft cabin having a longitudinal length between a front of the aircraft cabin and a rear of the aircraft cabin and having a lateral width between a first outboard sidewall of the aircraft cabin and a second outboard sidewall of the aircraft cabin;
extending the first and second interior sidewalls upwardly and curving the first and second interior sidewalls laterally toward each other to form a roof of the aircraft cabin;
providing an aft pressure bulkhead (APB) wall at the rear of the aircraft cabin extending laterally between the first and second interior sidewalls;
positioning a lavatory in the aircraft cabin adjacent a storage area at the rear of the aircraft cabin where the lavatory is not positioned along a longitudinal aisle of the aircraft cabin and is not occupying cabin space along the longitudinal aisle;

positioning the lavatory in the aircraft cabin between the stowage area and the first interior sidewall of the aircraft cabin, providing the lavatory with an enclosure including a front wall, the front wall having a doorway and a door secured to the front wall that can be manually operated to selectively open and close the doorway;

substantially conforming the aircraft body first interior sidewall to an outboard portion of the enclosure of the lavatory;

substantially conforming the aft pressure bulkhead to an aft portion of the enclosure of the lavatory;

providing an inboard wall portion of the enclosure of the lavatory between the lavatory and the stowage area serving to separate the lavatory and the stowage area, the inboard wall portion having a lower section, an intermediate section and an upper section that are all interconnected, the lower section extending vertically upwardly from the floor surface between a lower area of the lavatory and a lower area of the stowage area to the intermediate section, the intermediate section extending horizontally over the lower area of the stowage area from the lower section to the upper section, the upper section extending vertically upwardly from the intermediate section between an upper area of the lavatory and an upper area of the stowage area to a roof of the lavatory, whereby a lateral width dimension of the lavatory above the intermediate section is larger than a largest lateral width dimension of the lavatory below the intermediate section;

adding passenger seating to the cabin space along the central longitudinal aisle where the lavatory is not positioned.

15. The method of claim 14, further comprising:

providing a cross aisle in the aircraft cabin, the cross aisle extending laterally across the aircraft cabin between the first outboard sidewall of the aircraft cabin and the second outboard sidewall of the aircraft cabin, the cross aisle being intersected by a rearward end of the central longitudinal aisle; and, positioning the lavatory rearwardly of the cross aisle.

16. The method of claim 14, further comprising:

positioning a second lavatory in the aircraft cabin between the storage area and the second outboard sidewall of the aircraft cabin.

17. The aircraft of claim 1, further comprising:

a sink on the first interior sidewall of the aircraft body, the sink being positioned in the lavatory vertically below the internal wall intermediate section.

18. The aircraft of claim 8, further comprising:

a sink on the first interior sidewall of the aircraft body, the sink being positioned in the lavatory vertically below the internal wall intermediate section.

19. The method of claim 14, further comprising:

positioning a sink in the lavatory on the first interior sidewall of the aircraft cabin vertically below the internal wall intermediate section.

20. An aircraft comprising:

an aircraft body containing an aircraft cabin, the aircraft cabin having a longitudinal length between a front of the cabin and a rear of the cabin, and the aircraft cabin having a lateral width between opposite first and second interior sidewalls of the aircraft body, the first and second interior sidewalls extending upwardly and curving laterally toward each other to a roof of the aircraft cabin;

a floor surface in the aircraft cabin;

a stowage space in the aircraft cabin;

a lavatory in the aircraft cabin, the lavatory being positioned in an area available between the stowage space and the first interior sidewall of the aircraft body, the lavatory including a front wall as part of an enclosure of the lavatory, the front wall having a doorway and a door secured to the front wall that can be manually operated to selectively open and close the doorway;

a fuselage crowned surface of the aircraft having increased height in a region of the front wall of the lavatory as compared to a height of the fuselage crowned surface in a region of the rear of the lavatory;

a lavatory ceiling spaced from the fuselage crowned surface such that the lavatory ceiling has increased standing height in the region of the front wall of the lavatory as compared to standing height in the region of the rear of the lavatory;

the aircraft body first interior sidewall being located outboard of the lavatory;

an aircraft aft pressure bulkhead substantially located aft of the lavatory; and, an inboard wall portion of the enclosure of the lavatory serving to separate the lavatory and the stowage space, the inboard wall portion having a lower section, an intermediate section and an upper section that are all interconnected, the lower section extending vertically upwardly from the floor surface between a lower area of the lavatory and a lower area of the stowage space to the intermediate section, the intermediate section extending horizontally over the lower area of the stowage space from the lower section to the upper section, and the upper section extending vertically upwardly from the intermediate section between an upper area of the lavatory and an upper area of the stowage space to a roof of the lavatory, whereby a lateral width dimension of the lavatory above the intermediate section is larger than a largest lateral width dimension of the lavatory below the intermediate section.

21. The aircraft of claim 20, further comprising:

a visual apparent width in the upper area of the lavatory being further increased by location of a mirror in the upper area of the lavatory on the upper section of the inboard wall portion of the enclosure of the lavatory.

* * * * *